(12) United States Patent
Milman et al.

(10) Patent No.: US 8,863,225 B2
(45) Date of Patent: *Oct. 14, 2014

(54) GENERALIZED IDENTITY MEDIATION AND PROPAGATION

(75) Inventors: Ivan M. Milman, Austin, TX (US); Martin Oberhofer, Boeblingen (DE); Dmitriy Fot, Almaty (KZ)

(73) Assignee: International Business Machines Corporation, Armonk, NY (US)

( * ) Notice: Subject to any disclaimer, the term of this patent is extended or adjusted under 35 U.S.C. 154(b) by 542 days.

This patent is subject to a terminal disclaimer.

(21) Appl. No.: 12/826,614

(22) Filed: Jun. 29, 2010

(65) Prior Publication Data

US 2011/0321136 A1    Dec. 29, 2011

(51) Int. Cl.
*G06F 21/00* (2013.01)
*G06F 15/16* (2006.01)
*G06F 21/62* (2013.01)

(52) U.S. Cl.
CPC .................. *G06F 21/6218* (2013.01)
USPC ............ 726/1; 726/2; 726/3; 726/4; 726/5; 713/168; 713/169; 713/170

(58) Field of Classification Search
USPC ........... 726/1–5; 709/224, 242; 713/200, 201, 713/168–171
See application file for complete search history.

(56) References Cited

U.S. PATENT DOCUMENTS

| | | | | |
|---|---|---|---|---|
| 6,981,043 | B2 * | 12/2005 | Botz et al. ..................... | 709/225 |
| 7,587,368 | B2 * | 9/2009 | Felsher ........................... | 705/65 |
| 2004/0216147 | A1 * | 10/2004 | Yanosy et al. ................. | 719/328 |
| 2005/0144226 | A1 | 6/2005 | Purewal | |
| 2006/0015353 | A1 | 1/2006 | Reese | |
| 2006/0265719 | A1 | 11/2006 | Astl et al. | |
| 2008/0130682 | A1 | 6/2008 | Akadiri | |
| 2009/0064107 | A1 * | 3/2009 | Chan et al. ................... | 717/120 |
| 2009/0064271 | A1 | 3/2009 | Ng et al. | |
| 2009/0070456 | A1 * | 3/2009 | Brown et al. ................. | 709/224 |

FOREIGN PATENT DOCUMENTS

CN    11364924    2/2009

OTHER PUBLICATIONS

Erradi et al., "Policy-Driven Middleware for Self-Adaptation of Web Services Compositions," Proceedings of the ACM/IFIP/USENIX 2006 International Conference on Middleware, pp. 62-80, 2006.

Liu et al, "Eucalyptus: A Web Service-Enabled E-Infrastructure," Proceedings of the 2007 Conference of the Center for Advanced Studies on Collaborative Research, Cascon '07, Jan. 1, 2007, all pages, New York City, USA.

(Continued)

*Primary Examiner* — Venkat Perungavoor
*Assistant Examiner* — Amir Mehrmanesh
(74) *Attorney, Agent, or Firm* — John D. Flynn; Gregory K. Goshorn; Greg Goshorn, P.C.

(57) ABSTRACT

Provided are techniques for providing security in a computing system with identity mediation policies that are enterprise service bus (EBS) independent. A mediator component performs service-level operation such as message brokering, identity mediation, and transformation to enhance interoperability among service consumers and service providers. A mediator component may also delegate identity related operations to a token service of handler. Identity mediation may include such operations as identity determination, or "identification," authentication, authorization, identity transformation and security audit.

20 Claims, 8 Drawing Sheets

(56) References Cited

OTHER PUBLICATIONS

Sliman et al, "Single Sign-On Integration in a Distributed Enterprise Service Bus", Network and Service Security, 2009, N2S '09, International Conference on IEEE, pp. 1-5, Piscataway, New Jersey, USA.

Srirama et al., "Scalable Mobile Web Services Mediation Framework", Internet and Web Applicaiotns and Services (ICIW), 2010 Fifth International Conference on IEEE, pp. 315-320, Piscatawny, New Jersey, USA.

Zeiselmair, "PCT Search Report", Oct. 25, 2011, pp. 1-9, International Searching Authority, Rijswijk.

* cited by examiner

GENERALIZED IDENTITY MEDIATION AND PROPAGATION

FIELD OF DISCLOSURE

The claimed subject matter relates generally to computer security and, more specifically, to identity mediation between client applications and server applications.

SUMMARY

Provided are techniques for providing security in a computing system with identity mediation policies that are enterprise service bus (ESB) independent. In a typical computing system of today, a number of applications may be connected to a number of service providers via a mediator component. A mediator component may be an ESB that performs service-level operation such as message brokering, identity mediation, and transformation to enhance interoperability among service consumers and service providers. A mediator component may also delegate identity related operations to a token service or handler. Identity mediation may include such operations as identity determination, or "identification," authentication, authorization, identity transformation and security audit.

Provided are techniques for mediation in a computing system to provide secure access to a server application, comprising loading, into an identity mapping module, an identity mapping policy for specifying correspondence between a first set of identities and a second set of identities, wherein the first set of identities correspond to a party requesting a service, in conjunction with the client application, from the server application and the second set of identities correspond to the party and the server application; loading, into an authentication module, an authentication policy for authenticating a first identity of the first set of identities and a second identity of the second set identities, wherein the first identity and the second identity are mapped to each other by the identity mapping module with respect to the client application and the server application; loading, into an authorization module, an authorization policy for authorizing the second identity for access to the server application; and providing the service to the party based upon a mapping of the first identity to the second identity by the mapping module, an authentication of the first and second identities by the authentication module and an authorization of the second identity by the authorization module.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures, in which:

DETAILED DESCRIPTION

Figure 1:
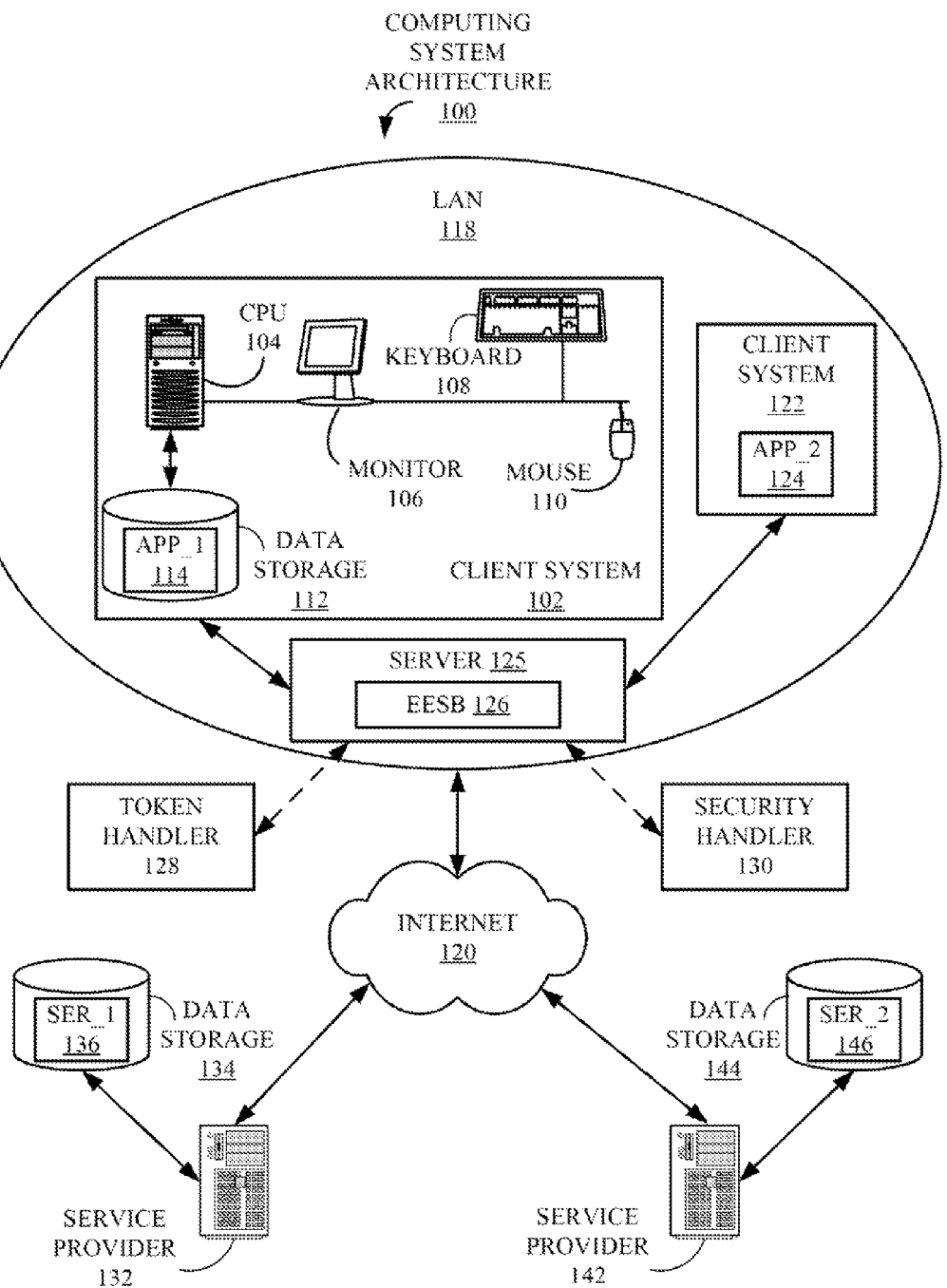
FIG. 1 is one example of a computing system that may implement an Enhanced Enterprise Service Bus (EESB) that implements the disclosed technology.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code, or logic, embodied thereon.

One embodiment, in accordance with the claimed subject, is directed to a programmed method for an Enhanced Enterprise Security Bus (EESB). The term "programmed method", as used herein, is defined to mean one or more process steps that are presently performed; or, alternatively, one or more process steps that are enabled to be performed at a future point in time. The term "programmed method" anticipates three alternative forms. First, a programmed method comprises presently performed process steps. Second, a programmed method comprises a computer-readable medium embodying computer instructions, which when executed by a computer performs one or more process steps. Finally, a programmed method comprises a computer system that has been programmed by software, hardware, firmware, or any combination thereof, to perform one or more process steps. It is to be understood that the term "programmed method" is not to be construed as simultaneously having more than one alternative form, but rather is to be construed in the truest sense of an alternative form wherein, at any given point in time, only one of the plurality of alternative forms is present.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As the Inventors herein have recognized, different applications may have different requirements with respect to identity mediation and each particular enterprise service bus (ESB) platform may have a different approach as to how identity mediation operations are configured and implemented. Therefore, the management of such an environment with the intent to consistently apply security policies is difficult. For example, a change in a security policy may require changes to applications, a process that can be redundant, error prone and time consuming. Other issues arise in a migration from one ESB to another, which may require recreation of all identity mediation policies from scratch on the new platform.

Issues with current ESB configurations include, but are not limited to:
1) Changes in security policy need to be implemented in each application that uses the ESB; this change is complex and difficult to implement in light of security audit requirements;
2) Typically, the first place in which authorization and identity mapping occur is in an information application, which is too late if information-centric applications are integrated across enterprise boundaries because a potential attacker may already be in a trusted zone of the enterprise;
3) Token service and specialized security handlers cannot be easily transferred from one ESB platform to another even if security policies are implanted in the ESBs; and
4) Information-centric applications lack powerful security policy enforcement capabilities, which may compromise security due to lack of integration among the ESB, policy tools and the information-centric application.

Turning now to the figures, FIG. 1 is one example of a computing system architecture 100 that may implement an Enhanced enterprise service bus (EEBS) in accordance with the disclosed technology. A client system 102 includes a central processing unit (CPU) 104, coupled to a monitor 106, a keyboard 108 and a mouse 110, which together facilitate human interaction with computing system 100 and client system 102. Also included in client system 102 and attached to CPU 104 is a data storage component 112, which may either be incorporated into CPU 104 i.e. an internal device, or attached externally to CPU 104 by means of various, commonly available connection devices such as but not limited to, a universal serial bus (USB) port (not shown). Data storage 112 is illustrated storing an example of a computer application, i.e. app_1 114, which is hosted by client system 102 and employs the claimed subject matter for mediation services. It should be noted that a typical computing system would include more than one application, but for the sake of simplicity only one is shown.

Client system 102 is communicatively coupled to a local area network (LAN) 118, which is coupled to the Internet 120. Also coupled to LAN 118 is an additional client system 122 and a server 125. Although not shown, client system 122 and server 125 would also typically include a CPU, monitor, keyboard, mouse and data storage. Client system 122 is illustrated hosting a second application, i.e. app_2 124, which is stored on a data storage (not shown) and executed on a CPU, or "processor," (not shown), both associated with server 122.

Server 125 is also illustrated with an enhanced enterprise service bus (EESB) 126, which is stored on data storage (not shown) and executed on a processor (not shown) associated with server 125. EESB 126 may utilize a token handler 128 and a security handler 130 to implement mediation service in accordance with the claimed subject matter. EESB 126 is described in more detail below in conjunction with FIGS. 2-8. Also communicatively coupled to the Internet 120 and therefore LAN 118, client systems 102 and 122, server 125 and EESB 126 are two service providers, or "servers," i.e. a service provider 132 and a service provider 142. Although not shown, servers 132 and 142 would also, like client system 102 and 122, typically include a CPU, monitor, keyboard, and mouse to enable human interaction. Server 132 is coupled to a data storage 134, which stores a service application, or "service,", i.e. ser_1 136, and server 142 is coupled to a data storage 144, which stores a service, i.e. ser_2 146. Services 136 and 146 each execute on a processor (not shown) associated with servers 132 and 142, respectively.

Although in this example, clients 102, 122, server 125, EESB 126 and servers 132 and 142 are communicatively coupled via LAN 118 the Internet 120, they could also be coupled through any number of communication mediums such as, but not limited to, additional LANs (not shown) or direct or indirect, wired or wireless connections. Further, it should be noted there are many possible computing system configurations, of which computing system 100 is only one simple example. Throughout the Specification, clients 102 and 122 applications 114 and 124, servers 125, 132 and 142 and services 136 and 146 are employed as examples of computing components that may implement and/or utilize the claimed subject matter.

Figure 2:
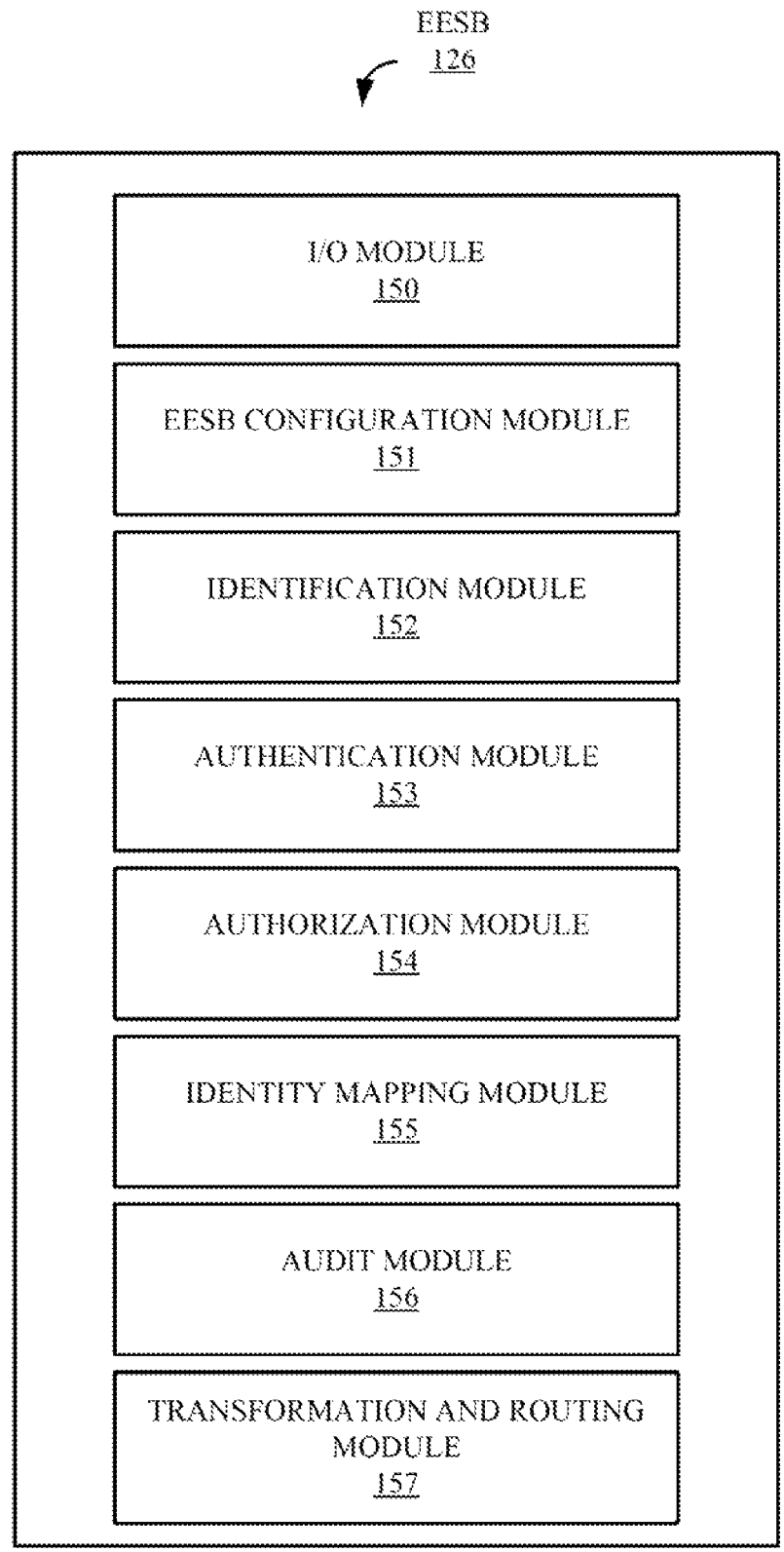
FIG. 2 is a block diagram of the EESB, first introduced in FIG. 1, in more detail.

FIG. 2 is a block diagram of EESB 126, first introduced above in FIG. 1, in more detail. EESB 126 includes an input/output (I/O) module 150, an EESB configuration module 151, an Identification module 152, an Authentication module 153, an Authorization module 154, an Identity Mapping module 155, an Audit module 156 and a Transformation and Routing module 157. For the sake of the following examples, EESB 126 is assumed to execute on server 125 (FIG. 1). In the alternative, EESB 126 may be stored on and execute on nearly any computing device such as computer 102 (FIG. 1) and servers 132 and 142.

It should be understood that the claimed subject matter can be implemented in many types of computing systems and data storage structures but, for the sake of simplicity, is described primarily in terms of computer 102, server 125 and the other elements of system architecture 100 (FIG. 1). In addition, the representation of EESB 126 in FIG. 2 is a logical model. In other words, each of components 150-157 may be stored in the same, separate or multiple files and loaded and/or executed within system 100 either as a single system or as separate processes interacting via any available inter process communication (IPC) techniques.

I/O module 150 handles any communication EESB 126 has with other components of system 100. EESB configuration module 151 includes processing logic and stores parameters that control the operation of EESB 126. Module 151 is described in more detail below in conjunction with FIG. 7. Identification module 152 enforces a policy for identifying a party requesting mediation by EESB 126. Module 152 is described in more detail below in conjunction with FIGS. 3, 4 and 8. Authentication module 153 enforces a policy for verifying the identity identified by Identification module 152. Module 153 is described in more detail below in conjunction with FIGS. 3 and 8. Authorization module 154 enforces an authorization policy for permitting an authorization operation to permit an access control check. Module 154 is described in more detail below in conjunction with FIGS. 3, 4 and 8.

Identity Mapping module 155 enforces identity mapping rules. Identity mapping rules may include, but are not limited to, identity replacement, simple identity mapping (value to value), directory-based mapping (value to lookup value) and rule-based identity mapping. Module 155 is described in more detail below in conjunction with FIGS. 3, 6 and 8. Audit module 156 defines the operation for the logging and audit of service requests. Module 156 is described in more detail below in conjunction with FIGS. 3 and 8.

Transformation and routing module 157 is employed for standard ESB processes such as, but not limited to, transformation, e.g. additional operations that may be performed on a service request, and routing. Other functions executed by EESB 126 that are not listed in conjunction with specific modules include, but are not limited to, service response filtering, service response masking, security token replacement, security token validation and verification, decryption of inbound security tokens, encryption of outbound security tokens and the implementation of security policy combination rules. Module 157 is described in more detail below in conjunction with FIGS. 3 and 8.

Figure 3:
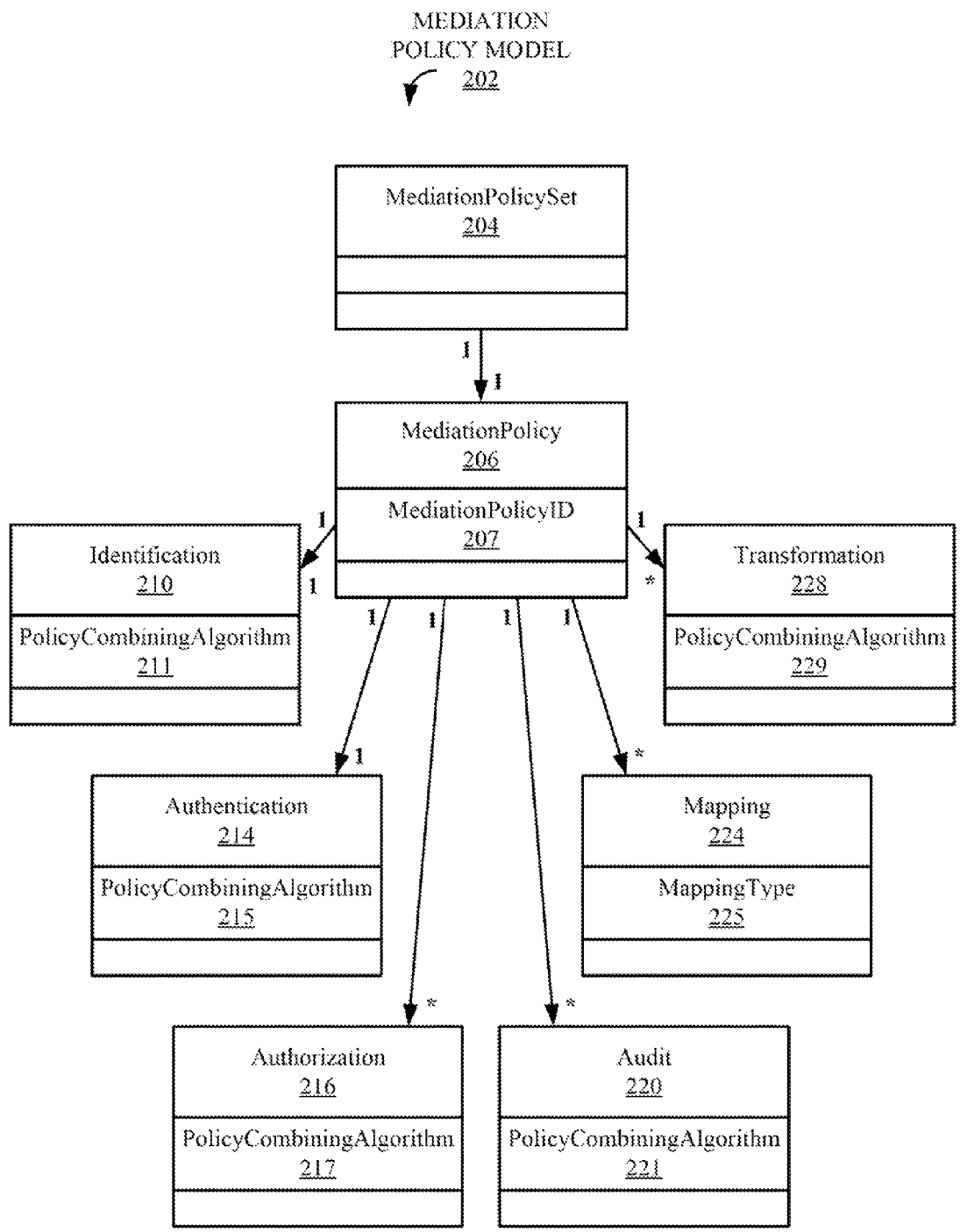
FIG. 3 is a block diagram of a high-level model for a mediation language employed by the EESB of FIGS. 1 and 2 to implement a mediation policy.

FIG. 3 is a block diagram of a high-level model for a mediation language model 202 employed by EESB 126 of FIGS. 1 and 2 to implement a mediation policy in conjunction with system 100 (FIG. 1). A MediationPolicySet data structure 204 is the root element of the disclosed identity mediation policy language. MediationPolicySet 204 stores references to all the identity mediation policy policies implemented by EESB 126 as defined by an appropriate administrator. A MediationPolicy 206 represents a complete instance of a policy for controlling identity mediation tasks. Some examples of specific policies that may be selected for a particular task of MediationPolicy 206 are listed below in conjunction with FIGS. 3-6. A MediationPolicy ID 207 is the part of MediationPolicy 206 that identifies a specific mediation policy. MediationPolicyID 207 may store a reference to an identification policy already in use, i.e. an IdentificationPolicy 210, or reference a policy that has been previously declared, i.e. IdentificationPolicyRef 238 (see FIG. 4).

It should be noted that lines that connect elements of FIGS. 3-6 include numbers that indicate a relationship between any two particular elements. For example, the line between MediationPolicySet 204 and MediationPolicy 206 has the character '1' at both ends. These characters indicate that elements 204 and 206 have a one-to-one relationship, i.e. for each instance of element 204 there is one instance of element 206. Other characters employed in this fashion include a '*' character and a "0 . . . 1" symbol. The '*' character indicates that the corresponding element, i.e. the particular element closest to the number, many have many instances and the "0 . . . 1" symbol indicates that there may be either 0 or 1 of the corresponding element. For example MediationPolicy 206 and a Transformation data structure 228 have a one-to-many relationship.

MediationPolicy 206 has a one-to-one relationship with Identification 210, which defines how to determine the identity of a particular service consumer. Element 210 stores an IdentificationMethod attribute (not shown) that indicates the selected identification mechanism. In this example elements 206 and 210 have a one-to-one relationship. Examples of some possible identification mechanisms include, but are not limited to, a web services-security (WS-Security) username token, a client IP address, a lightweight third-party authentication (LTPA) mechanism, a security assertion markup language (SAML) token, a custom XPath expression applied to the request, a Kerberos AP-REQ from Simple and Protected GSSAPI Negotiation Mechanism (SPNEGO) token and a hypertext transfer protocol (HTTP) Authentication header. A PolicyCombiningAlgorithm element 211 provides a mechanism for combining multiple identification policies in the event two or more policies are specified, by, for example, specifying which one or which multiples in any particular order should be executed. Identification 206 is described in more detail below in conjunction with FIG. 4.

MediationPolicy 206 has a one-to-one relationship with Authentication 214, which defines a method of authenticating, or verifying, the identity as determined by the method specified by Identification 210. Element 214 may specify a new authentication policy or reference a policy that has been previously declared. An authentication policy contains an AuthenticationMethod attribute (not shown) that indicates one or more authentication mechanisms. Examples of possible authentication mechanisms include, but are not limited to, binding to a lightweight directory access protocol (LDAP) server, validating a LTPA token, validating a SAML assertion, using a SAML server for a SAML authentication statement, using a TIVOLI® access manager server or a WS-Trust server and validating a signer certificate for a digitally signed request. A PolicyCombiningAlgorithm element 215 provides a mechanism for combining multiple authentication policies in the event two or more policies are specified, by, for example, specifying which one or which multiples in any particular order should be executed. In an alternative embodiment, element 215 may enforce an authentication policy with respect to another module's policy. For example, a user who is authenticated with a private key may be allowed to access one particular service while a user authenticated with a password is not.

MediationPolicy 206 has a one-to-many relationship with an Authorization 216, each of which defines a particular method of authorizing execution of a request from a service customer, provided the service customer has been identified, as explained above in conjunction with element 210, and the identity authenticated, as described above in conjunction with element 214. Element 216 may specify a new authorization policy or reference a policy that has been previously declared. An authorization policy contains an AuthorizationMethod attribute (not shown) that indicates one or more authorization mechanisms. Examples of possible authorization mechanisms include, but are not limited to, using an extensible access control markup language (XACML) policy decision point, checking for membership in a LDAP group, generating a SAML authorization query and calling an authorization (AZN) application programming interface (API). A PolicyCombiningAlgorithm element 217 provides a mechanism for combining multiple authorization policies in the event two or more policies are specified, by, for example, specifying which one or which multiples in any particular order should be executed. Authorization 216 is described in more detail below in conjunction with FIG. 5.

MediationPolicy 206 has a one-to-many relationship with an Audit 220, each of which defines a particular method of auditing an inbound request from a service customer. It should be noted that a service request may be audited even though the service customer has been identified, as explained above in conjunction with element 210, and the identity has not been authenticated, as described above in conjunction with element 214 and/or the request has not been authorized, as explained above in conjunction with element 216. Element 220 may specify a new audit policy or reference a policy that has been previously declared. An audit policy contains an AuditMethod attribute (not shown) that indicates one or more audit mechanisms. Examples of possible audit mechanisms include, but are not limited to, creating a log record or file, creating one or more database records and sending one or more electronic messages, or "emails," to an appropriate party. A PolicyCombiningAlgorithm element 221 provides a mechanism for combining multiple audit policies in the event two or more policies are specified, by, for example, specifying which one or which multiples in any particular order should be executed.

MediationPolicy 206 has a one-to-many relationship with an Mapping 224, each of which defines a particular method of mapping one identity to another, for example when a particular service customer is know by different names by different service providers. For example, mapping 224 may be employed when a service consumer and a service provider use different user registries or in similar circumstances. Element 224 may specify a new mapping policy or reference a policy that has been previously declared. A mapping policy contains a MappingMethod attribute (not shown) that indicates one or more mapping mechanisms. Examples of possible mapping mechanisms include, but are not limited to, one-to-one mapping, mapping based upon a LDAP lookup and rule-based mapping. A MappingType element 225 specifies how a particular mapping is performed. Mapping 224 is described in more detail below in conjunction with FIG. 6.

MediationPolicy 206 has a one-to-many relationship with a Transformation 228, each of which defines a particular method of transforming a service request. A transformation of a service request is an additional operation that is executed on the service request before the request is transmitted to a service provider. Element 228 may specify a new transformation policy or reference a policy that has been previously declared. A transformation policy contains a TransformationMethod attribute (not shown) that indicates one or more transformation mechanisms. Examples of possible transformation mechanisms include, but are not limited to, a custom extensible style sheet language transformation (XSLT), a WS-Security token replacement, TIVOLI® federated identity manager (TFIM) token replacement, generating a LTPA token and generating a SAML assertion. A PolicyCombiningAlgorithm element 229 provides a mechanism for combining multiple transformation policies in the event two or more policies are specified, by, for example, specifying which one or which multiples in any particular order should be executed.

By providing structures such as 210, 214, 216, 220, 220, 224 and 228, the claimed subject matter is able to provide a platform-independent, or "enhanced," ESB. The standardization of interfaces provides means for individual mediation policies to be replaced without requiring changes to either applications, such as app_1 144 (FIG. 1) and app_2 (FIG. 1) and servers, such as ser_1 (FIG. 1) and ser_2 (FIG. 1). In this manner, changes in a security policy do not need to be implemented in each application that uses EESB 126. In addition, authorization and identity mapping may be removed from information applications and token service and specialized security handlers can be easily transferred from one ESB platform to another even if security policies are implanted in the ESBs.

Figure 4:
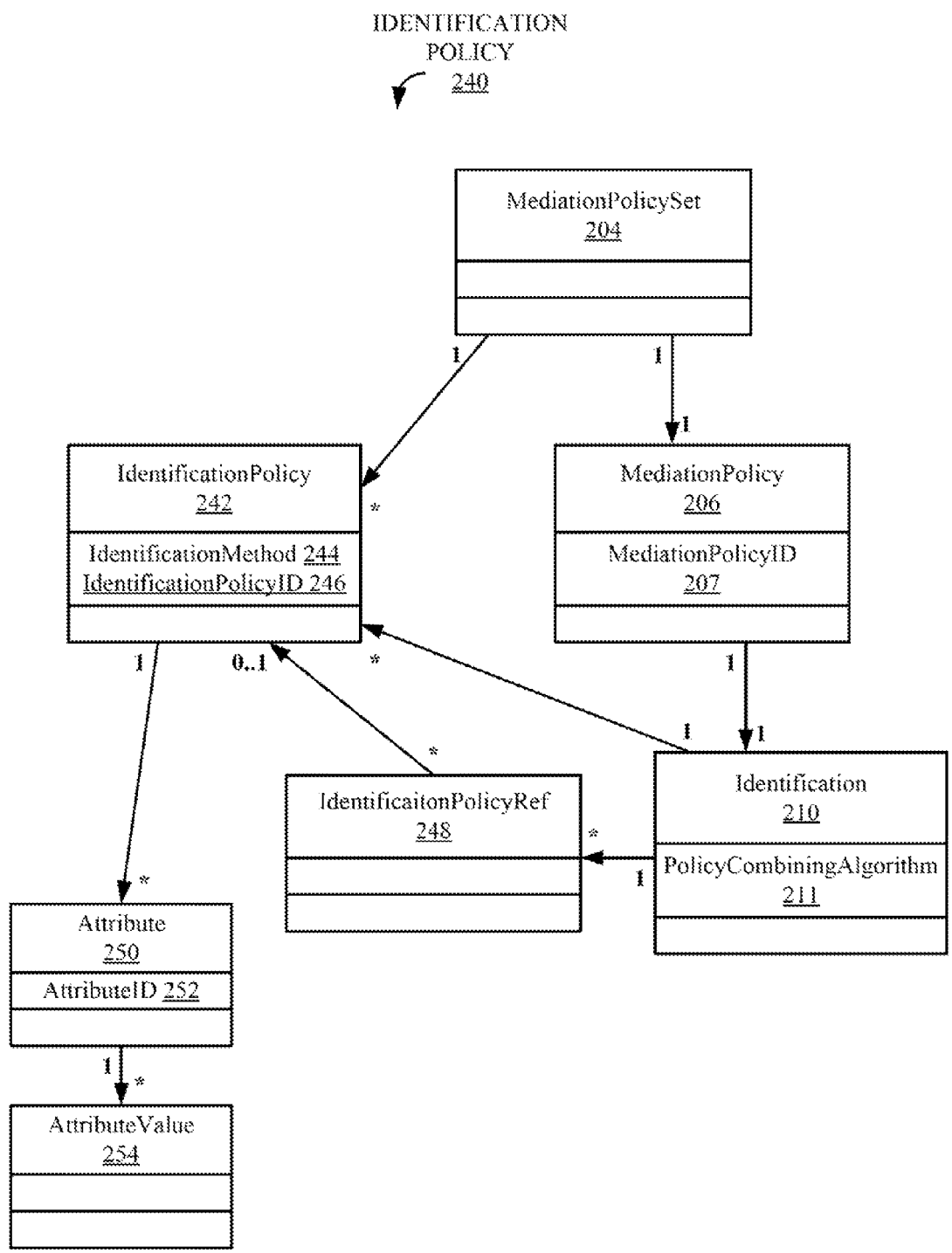
FIG. 4 is a block diagram of a model of an identification policy of the mediation language of FIG. 3 employed by the EESB of FIGS. 1 and 2.

FIG. 4 is a block diagram of a model for an identification policy 240 (see 152, FIG. 2 and 210, FIG. 3) of mediation language 202 of FIG. 3 employed by the EESB 126 of FIGS. 1 and 2. Like FIG. 3, Identification policy 240 includes MediationPolicySet 204, MediationPolicy 206, MediationPolicyID 207, Identification 210 and PolicyCombiningAlgorithm 211. Both MediationPolicySet 204 and Identification 210 are illustrated as having a one-to-many relationship with an IdentificationPolicy 242. Each instantiation of IdentificationPolicy 242 represents a particular method for performing an identification function, as described above in conjunction with FIG. 3. As explained above, functions may include, but are not limited to, a WS-Security username token, a client IP address, a LTPA mechanism, a SAML token, a custom XPath expression applied to the request, a Kerberos AP-REQ from SPNEGO token and a HTTP Authentication header.

A specific method is identified by an instantiation of element 242 with an IdentificationMethod attribute 244. The specific instantiation of element 242 is associated with an IdentificationPolicyID 246, which is a key that uniquely identifies the specific instantiation of the policy. Attributes 244 and 246 are two examples of specific properties associated with element 242. Attributes 244 and 246, as well as any other attributes are stored in an Attribute 250, which includes an AttributeID 252 to uniquely identify the corresponding attribute. Each attribute 250 is also associated with one or more attribute values 254. In general, an attribute is a generic element used in the different elements to provide policy designers with a mechanism for defining additional policy configurations. For example, an attribute in used in an AuthenticationPolicy element (not shown) may be a host name of a particular LDAP server. Identification 210 may also be associated with multiple IdentificationPolicyRef 248, each of which provides a reference to a particular instantiation of IdentificationPolicy 242.

Figure 5:
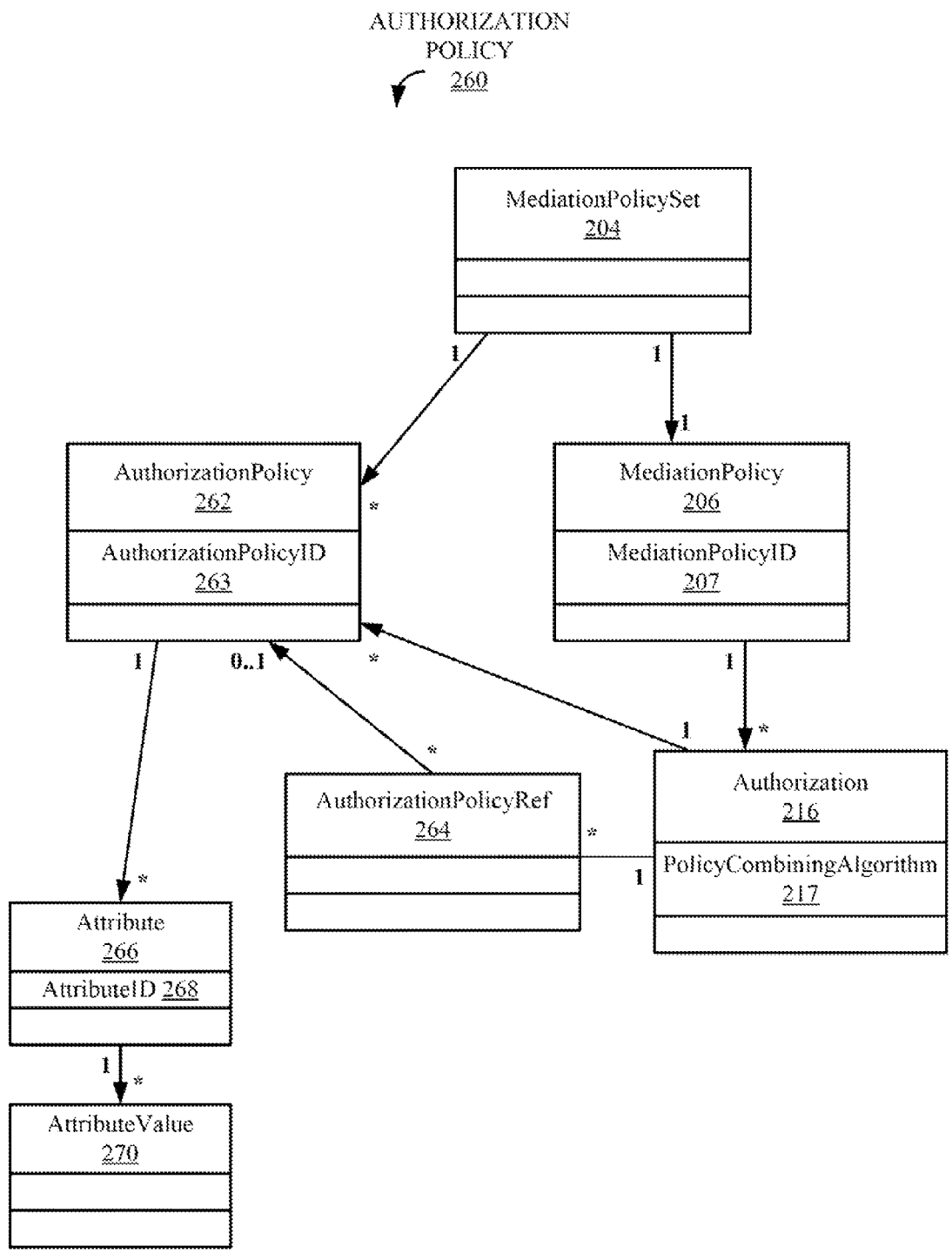
FIG. 5 is a block diagram of a model of an authorization policy of the mediation language of FIG. 3 employed by the EESB of FIGS. 1 and 2.

FIG. 5 is a block diagram of a model for an authorization policy 260 (see 154, FIG. 2 and 216, FIG. 3) of the mediation language 202 of FIG. 3 employed by the EESB 126 of FIGS. 1 and 2. Like FIG. 3, Identification policy 260 includes MediationPolicySet 204, MediationPolicy 206, MediationPolicyID 207, Authorization 216 and PolicyCombiningAlgorithm 217. Both MediationPolicySet 204 and Authorization 216 are illustrated as having a one-to-many relationship with an AuthorizationPolicy 262. Each instantiation of AuthorizationPolicy 262 represents a particular method for performing an authorization function as described above in conjunction with FIG. 3, which as explained above may include, but are not limited to, using an XACML policy decision point, checking for membership in a LDAP group, generating a SAML authorization query and calling an AZN API.

A specific method is identified by an instantiation of element 262 with an AuthorizationMethod attribute (not shown). The specific instantiation of element 262 is associated with an AuthorizationPolicyID 263, which is key that uniquely identifies the specific instantiation. An attribute 266 is a specific property associated with element 262. AuthorizationMethod attribute and AuthorizationPolicyID, as well as any other attributes are stored in an Attribute 266, which includes an AttributeID 268 to uniquely identify the corresponding attribute. Each attribute 266 is also associated with one or more attribute values 270. Authorization 216 may also be associated with multiple AuthorizationPolicyRef 264, each of which provides a reference to a particular instantiation of AuthorizationPolicy 262.

Figure 6:
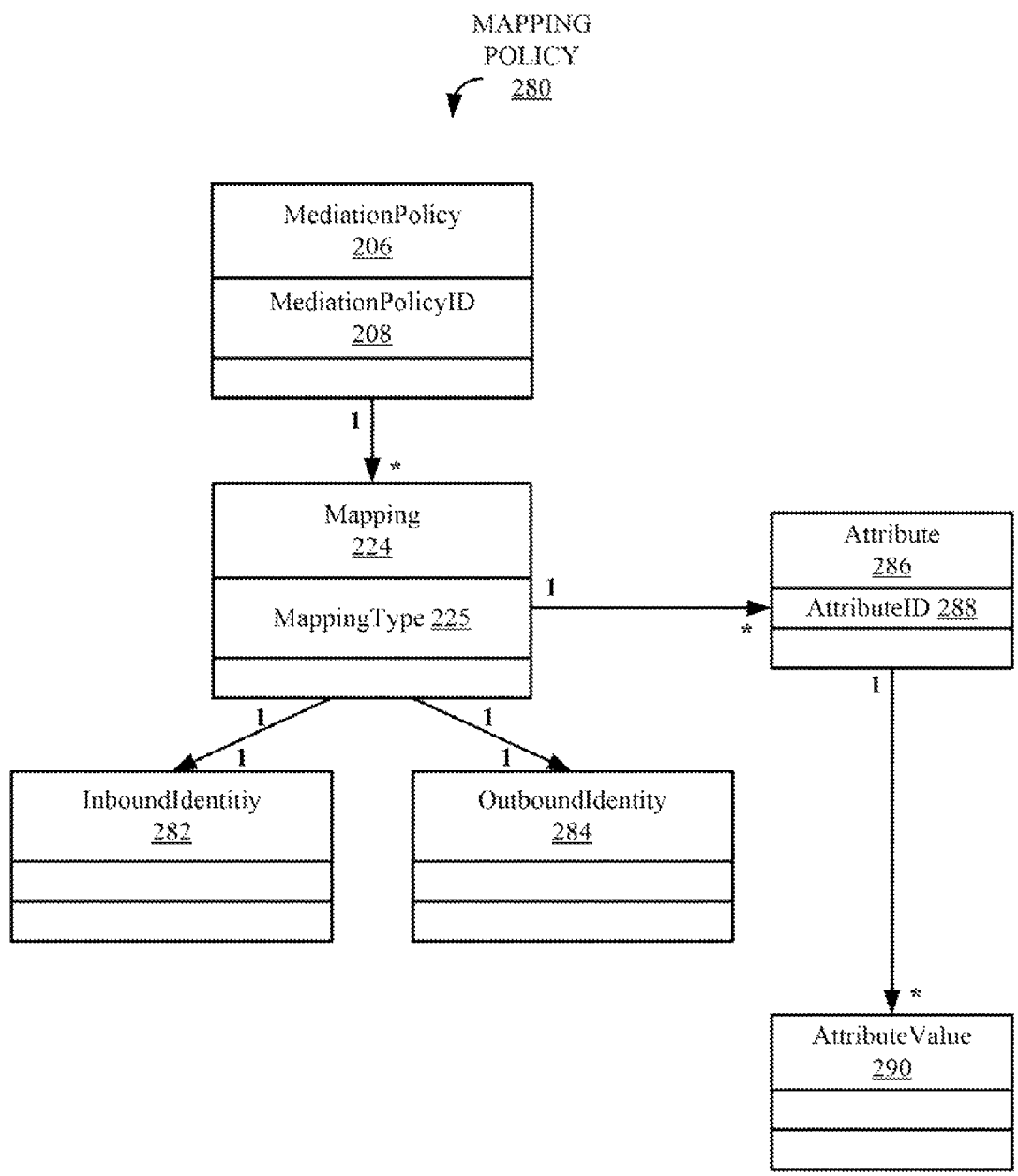
FIG. 6 is a block diagram of a model of a mapping policy of the mediation language of FIG. 3 employed by the EESB of FIGS. 1 and 2.

FIG. 6 is a block diagram of a model for a mapping policy 280 (see 155, FIG. 2 and 224, FIG. 3) of the mediation language 202 of FIG. 3 employed by the EESB 126 of FIGS. 1 and 2. Mapping 224 is typically employed in situations when a service consumer and a service provider use different user registries or in other similar circumstances.

Like FIG. 3, Identification policy 260 includes MediationPolicy 206, MediationPolicyID 207, Mapping 224 and MappingType 225. Each instantiation of Mapping 224 represents a particular method for performing a mapping function as described above in conjunction with FIG. 3, which as explained above may include, but are not limited to, one-to-one mapping, mapping based upon a LDAP lookup and rule-based mapping. Each instantiation of mapping 224 is associated with an InboundIdentity element 282 that is used in conjunction with one-to-one mapping. Element 282 indicates the target identity for the current mapping policy. Each instantiation of mapping 224 is also associated with an OutboundIdentity element 284 that is used in conjunction with one-to-one mapping. Element 284 indicates the destination identity for the current mapping policy. Like the other elements of mediation policy model 202, mapping 224 may include additional attributes 286, each of which is associated with an attributeID 288, which uniquely identifies a particular attribute 286. Each attribute 286 is also associated with one or more Attribute Values 290, which stores the relevant data associated with each attribute 286.

Figure 7:
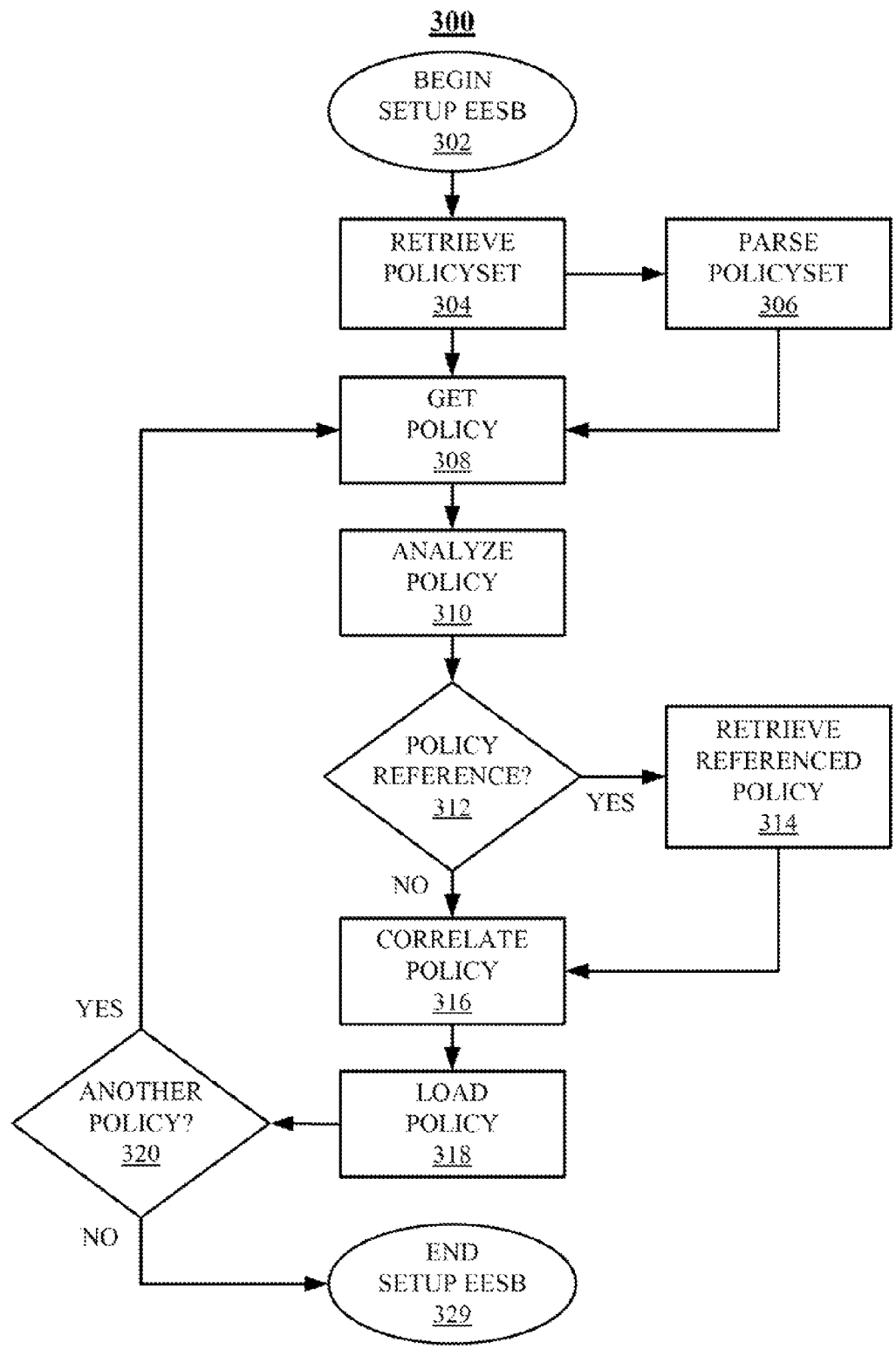
FIG. 7 is a flowchart of Setup EESB process that is an example of one processing aspect of the claimed subject matter.

FIG. 7 is a flowchart of Setup EESB process 300 that is an example of one aspect of the claimed subject matter. In this example, logic associated with process 300 is stored on data storage and executed on a processor associated with server 125 (FIG. 1) as part of EESB 126 (FIGS. 1 and 2). Process 300 starts in a "Begin Setup EESB" block 302 and proceeds immediately to a "Retrieve PolicySet" block 304. During block 304, process 300 retrieves a MediationPolicySet 204 that is, as explained above in conjunction with FIGS. 3-5, a data structure that defines a platform-independent identity mediation policy, such as MediationPolicy 206 (FIGS. 3-6). As explained above in conjunction with FIG. 3, a MediationPolicySet 204 is typically defined by an authorized administrator.

During a "Parse PolicySet" block 306, process 300 analyzes MediationPolicy 206, which was retrieved during block 204. In general, process 300 identifies individual MediationPolicy 206 policy components such as components 210, 214, 216, 220, 224 and 228 (FIG. 3). During a "Get Next Policy" block 308 begins to process each component, or module, identified during block 306. For example, the first time through block 206, process 300 may process Identification 210 (FIGS. 3 and 4). During an "Analyze Policy" block 310, process 300 examines, in this example, the values stored in Identification 210 to ascertain how a specific identification policy is identified.

During a "Policy Reference?" block 312, process 300 determines whether or not Identification 210 lists a specific identification policy, such as IdentificationPolicy 242 (FIG. 4) directly or provides a reference to a particular identification policy via IdentificationPolicyRef 248 (FIG. 4). If process 300 determines that a reference to a policy is employed, control proceeds to a "Retrieve Referenced Policy" block 314 during which the specific policy is identified.

During a "Correlate Policy" block 316 the specific policy being processed is correlated with a particular module such as components 210, 214, 216, 220, 224 and 228 (FIG. 3). During a "Load Policy" block 318, process 300 loads into memory for processing by EESB 126 the specific policy that was identified either during block 312 or block 314 into the component 210, 214, 216, 220, 224 and 228 identified during block 316. During "Another Policy" block 320, process 300 determines whether there is another type of policy that needs to be loaded into EESB 126. For example, once an identification policy has been loaded, an authentication policy such as Authentication 214 (FIG. 3), Authorization 216 (FIGS. 3 and 5), Audit 220 (FIG. 3), Mapping 224 (FIG. 3) and Transformation (FIG. 3) may be processed and loaded. If process 300 determines that one or more policies remain to be loaded, control returns to Get Policy block 308, the next unprocessed policy is retrieved and processing continues as described above.

Finally, if process 300 determines during block 320 that all relevant policies have been loaded into EESB 126, control proceeds to an "End Setup EESB" block 329 in which process 300 is complete.

Figure 8:
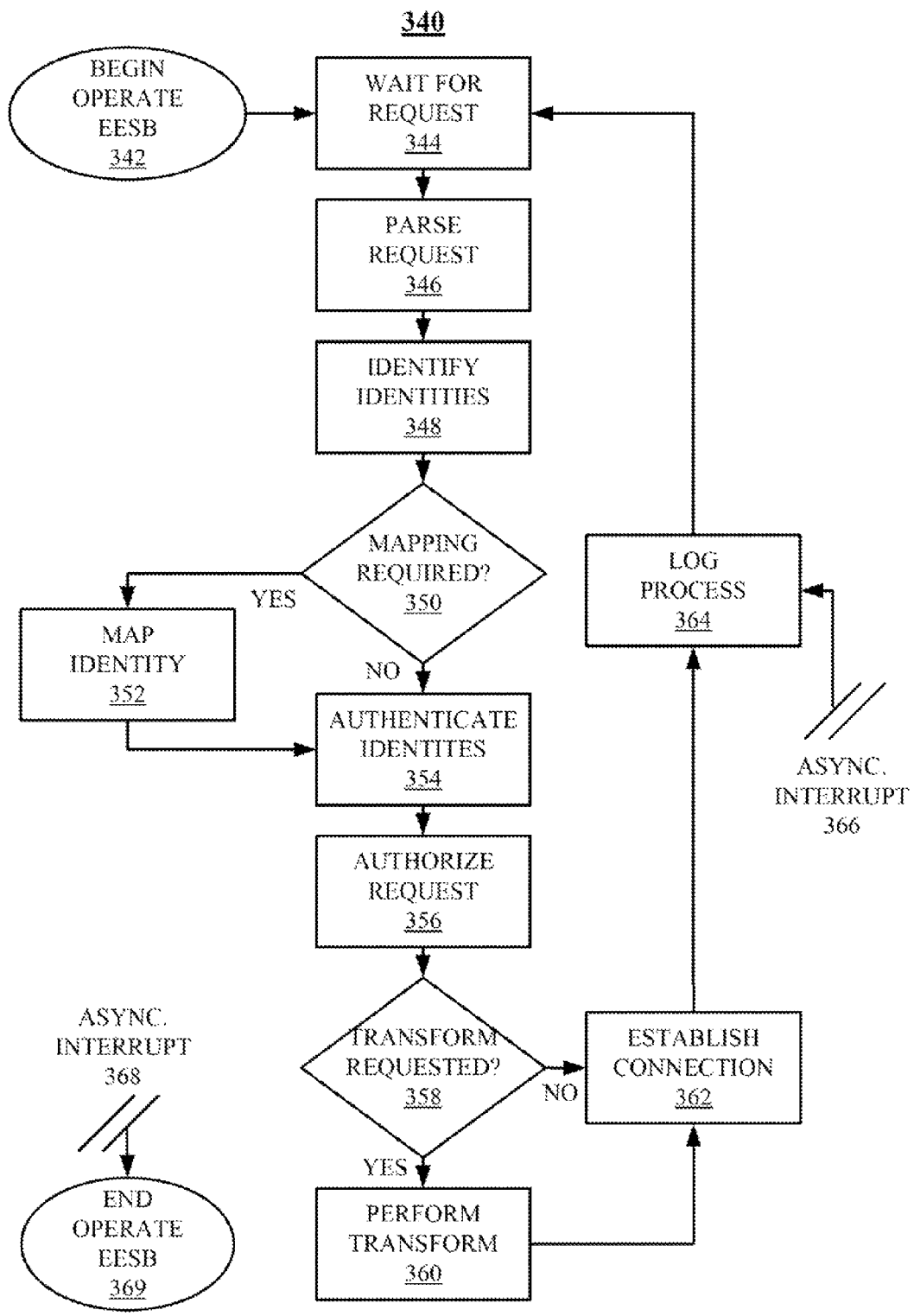
FIG. 8 is a flowchart of an Operate EESB process that is an example of one processing aspect of the claimed subject matter.

FIG. 8 is a flowchart of an Operate EESB process 240 that is an example of one processing aspect of the claimed subject matter. Like process 300, in this example, logic associated with process 340 is stored on data storage and executed on a processor associated with server 125 (FIG. 1) as part of EESB 126 (FIGS. 1 and 2). Process 340 is initiated during Setup EESB process 300 (see 320, FIG. 7). Process 340 starts in a "Begin Operate EESB" block 342 and proceeds immediately to a "Wait for Request" block 344.

During block 344, process 340 waits for a mediation request. For example app_1 114 (FIG. 1) may make a request of a service provided by ser_1 136 (FIG. 1). During a "Parse Request" block 346, process 340 determines the nature of the request by identifying both the requestor and the requested service. During an "Identify Identity" block 348 (see 210, FIGS. 3 and 4), process 340 determines the identity of the party making the request (see 282, FIG. 6) and, during a "Mapping Required?" block 350 (see 224, FIGS. 3 and 6), process 340 determines whether or not the identity associated, in this example with app_1 114 is the same as an identity expected or authorized to access serv_1 136 (see 284, FIG. 6). Typically, information necessary for this determination is stored in configuration data stored in conjunction with EESB 126 (see 151, FIG. 2).

If process 340 determines that a mapping is required, control proceeds to a "Map Identity" block 352 (see 224, FIGS. 3 and 6). During block 352, process 340 associates the identity identified during block 348 (see 282, FIG. 6) with an appropriate identity associated with the service indentified during block 346 (see 284, FIG. 6). Once mapping is complete during block 353 or, if during block 350 process 340 has determined that mapping is not required, control proceeds to an "Authenticate Identities" block 354 (see 214, FIG. 3). During block 354, process 340 determines that the parties identified during blocks 348 and 352 are the actual identities, i.e. a "spoofing" detection is made. Those with skill in the computing and communication arts should be familiar with various techniques to perform this task.

During an "Authorize Request" block 356, process 340 verifies that the identities identified during blocks 348 and 352 and authenticated during block 354 are authorized to access the services of the requested service (see 216, FIGS. 3 and 5). During a "Transform Required?" block 358, process 340 determines whether or not the request received during block 344 requires any additional processing (see 228, FIG. 3). If so, control proceeds to a "Perform Transform" block 360 during which the additional processing is executed. Once any transformation processing is complete during block 360 or, if during block 358 process 340 has determined that not such processing is required, control proceeds to an "Establish Connection" block 362 during which the connection between, in this example app_1 114 and ser_1 136 is established and ser_1 136 may process the request of app_1 114.

Once a connection has been established, process 340 proceeds to a "Log Process" block 364 during which the processing is logged, if process 340 is so configured (see 220, FIG. 3). It should be noted that if any processing fails to executed properly, for example identities cannot be identified during block 348, identities cannot be authenticated during block 354 or a request cannot be authorized during block 356, an asynchronous ("async.") interrupt 366 is generated and control is passed to Log Process block 364 and that information is logged. Once information is logged during block 364, process 340 returns to Wait for Request block 344 and processing continues as described above.

Finally, process 340 is halted by means of an asynchronous interrupt 368, which passes control to an "End Operate EESB" block 369 in which process 340 is complete. Interrupt 268 is typically generated when the OS, browser, application, etc. of which process 340 is a part is itself halted. During nominal operation, process 340 continuously loops through the blocks 344, 346, 248, 350, 352, 354, 356, 358, 360, 362 and 364, processing mediation requests as they are received.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. An enterprise service bus, comprising:
   a plurality of processors;
   a computer-readable storage medium, coupled to the plurality of processors;
   an identity mapping module;
   an authentication module;
   an authorization module; and
   logic, stored on the computer-readable storage medium and executed on the plurality of processors, for:
      retrieving, by the identity mapping module, an identity mapping policy for specifying direct and one-to-one correspondences between each identity of a first set of identities and each identity of a second set of identities, wherein the first set of identities correspond to a party and a client application, executed on a client computer, and the second set of identities correspond to the party and a server application, executed on a server computer;

retrieving, by the authentication module, an authentication policy for authenticating a first identity of the first set of identities and a second identity of the second set identities, wherein the first identity and the second identity are mapped to each other by the identity mapping module;

retrieving, by the authorization module, an authorization policy for authorizing the second identity for access to the server application and providing a service, corresponding to a service request, from the server application to the party based upon a mapping of the first identity to the second identity, an authentication of the first and second identities and an authorization of the second identity.

2. The enterprise service bus of claim 1, further comprising:
an audit module; and
logic, stored on the computer-readable storage medium and executed on the plurality of processors, for
retrieving, by the audit module of the first enterprise service bus, and audit policy for auditing the mapping module, the authentication module and the authorization module to produce an audit trail; and
storing, on the computer-readable storage media, the audit trail.

3. The enterprise service bus of claim 2, wherein the audit trail comprises one or more of:
a log file;
a plurality of database records; and
a plurality electronic messages to an appropriate party.

4. The enterprise service bus of claim 1, the logic further comprising logic, stored on the computer-readable storage medium and executed on the plurality of processors, for:
retrieving, by the identity mapping module, a second identity mapping policy for specifying correspondence between the first set of identities and the second set of identities;
retrieving, by the authentication module, a second authentication policy for authenticating the first identity of the first set of identities and the second identity of the second set identities; and
retrieving, by the authorization module, a second authorization policy for authorizing the second identity for access to the server application.

5. The enterprise service bus of claim 1, further comprising:
a transformation module; and
stored on the computer-readable storage medium and executed on the plurality of processors, for:
retrieving by the transformation module, a transformation policy; and
modifying, by the transformation module, the service request based upon the transformation policy.

6. A non-transitory computer-readable storage medium storing a computer programming product for providing secure access to a server application, comprising:
logic, stored on the computer-readable storage medium for execution on a processor, for:
retrieving, by an identity mapping module of a first enterprise service bus, an identity mapping policy for specifying direct and one-to-one correspondences between a first set of identities and a second set of identities, wherein the first set of identities correspond to a party and a client application, executed on a client computer, and the second set of identities correspond to the party and the server application, executed on a server computer;

retrieving, by an authentication module of the first enterprise service bus, an authentication policy for authenticating a first identity of the first set of identities and a second identity of the second set identities, wherein the first identity and the second identity are mapped to each other by the identity mapping module;

retrieving, by an authorization module of the first enterprise service bus, an authorization policy for authorizing the second identity for access to the server application;

providing a service, corresponding to a service request, from the server application to the party based upon a mapping of the first identity to the second identity by the mapping module, an authentication of the first and second identities by the authentication module and an authorization of the second identity by the authorization module.

7. The computer programming product of claim 6, the logic further comprising logic for:
retrieving, by an audit module of the first enterprise service bus, and audit policy for auditing the mapping module, to authentication module and the authorization module to produce an audit trail; and
storing, on a computer-readable storage media, the audit trail.

8. The computer programming product of claim 7, wherein the audit trail comprises one or more of:
a log file;
a plurality of database records; and
a plurality of electronic messages to an appropriate party.

9. The computer programming product of claim 6, the logic further comprising logic for;
retrieving, by a second identity mapping module, a second authentication module and a second authorization module, each corresponding to a second enterprise service bus, the identity mapping policy, the authentication policy and the authorization policy, respectively, wherein the second enterprise service bus is a different type of enterprise service bus than the first enterprise service bus;
providing the service from the server application to the party based upon a mapping of the first identity to the second identity by the second mapping module, an authentication of the first and second identities by the second authentication module and an authorization of the second identity by the second authorization module.

10. The computer programming product of claim 6, the logic further comprising logic for:
retrieving by a transformation module of the first enterprise service bus, a transformation policy; and
modifying, by the transformation module, the service request based upon the transformation policy.

11. A non-transitory computer-readable storage medium storing a computer programming product for providing secure access to a server application, comprising:
logic, stored on the computer-readable storage medium for execution on a processor, for:
transmitting, to an identity mapping module of a first enterprise service bus, an identity mapping policy for specifying direct and one-to-one correspondences between a first set of identities and a second set of identities, wherein the first set of identities correspond to a party and a client application, executed on a client computer, and the second set of identities correspond to the party and the server application, executed on a server computer;

transmitting, to an authentication module of the first enterprise service bus, an authentication policy for authenticating a first identity of the first set of identities and a second identity of the second set identities, wherein the first identity and the second identity are mapped to each other by the identity mapping module;

transmitting, to an authorization module of the first enterprise service bus, an authorization policy for authorizing the second identity for access to the server application;

executing a service, corresponding to a service request and the server application, for the party based upon a mapping of the first identity to the second identity by the mapping module, an authentication of the first and second identities by the authentication module and an authorization of the second identity by the authorization module.

12. The computer programming product of claim 11, the logic further comprising logic for:

transmitting, to an audit module of the first enterprise service bus, and audit policy for auditing the mapping module, the authentication module and the authorization module to produce an audit trail; and storing, on a computer-readable storage media, the audit trail.

13. The computer programming product of claim 12, wherein the audit trail comprises one or more of:

a log file;

a plurality of database records; and a plurality of electronic messages to an appropriate party.

14. The computer programming product of claim 11, the logic further comprising logic for:

transmitting, to a second identity mapping module, a second authentication module and a second authorization module, each corresponding to a second enterprise service bus, the identity mapping policy, the authentication policy and the authorization policy, respectively, wherein the second enterprise service bus is a different type of enterprise service bus than the first enterprise service bus;

executing the service for the party based upon a mapping of the first identity to the second identity by the second mapping module, an authentication of the first and second identities by the second authentication module and an authorization of the second identity by the second authorization module.

15. The computer programming product of claim 11, the logic further comprising logic for:

transmitting to a transformation module of the first enterprise service bus, a transformation policy; and modifying, by the transformation module, the service request based upon the transformation policy.

16. A method, comprising:

retrieving an identity mapping policy for specifying direct and one-to-one correspondences between each identity of a first set of identities and each identity of a second set of identities, wherein the first set of identities correspond to a party and a client application, executed on a client computer, and the second set of identities correspond to the party and a server application, executed on a server computer;

retrieving an authentication policy for authenticating a first identity of the first set of identities and a second identity of the second set identities, wherein the first identity and the second identity are mapped to each other by the identity mapping module;

retrieving an authorization policy for authorizing the second identity for access to the server application and providing a service, corresponding to a service request, from the server application to the party based upon a mapping of the first identity to the second identity, an authentication of the first and second identities and an authorization of the second identity.

17. The method of claim 16, further comprising:

retrieving to produce an audit trail; and storing, on a computer-readable storage media, the audit trail.

18. The method of claim 17, wherein the audit trail comprises one or more of;

a log file;

a plurality of database records; and a plurality of electronic messages to an appropriate party.

19. The enterprise service bus of claim 16, further comprising:

retrieving a second identity mapping policy for specifying correspondence between the first set of identities and the second set of identities;

retrieving a second authentication policy for authenticating the first identity of the first set of identities and the second identity of the second set identities; and retrieving a second authorization policy for authorizing the second identity for access to the server application.

20. The method of claim 16, further comprising:

retrieving a transformation policy; and modifying the service request based upon the transformation policy.

* * * * *